United States Patent [19]

Cirigliano et al.

[11] Patent Number: 6,036,986
[45] Date of Patent: *Mar. 14, 2000

[54] CINNAMIC ACID FOR USE IN TEA CONTAINING BEVERAGES

[75] Inventors: Michael Charles Cirigliano, Cresskill; William Conrad Franke, Cranbury; Meghan Mary Kemly, Mahwah; Raymond Thomas McKenna, Scotch Plains; Paul John Rothenberg, New Milford, all of N.J.

[73] Assignee: Lipton, Division of Conopco, Inc., Englewood Cliffs, N.J.

[ * ] Notice: This patent is subject to a terminal disclaimer.

[21] Appl. No.: 08/958,960

[22] Filed: Oct. 28, 1997

[51] Int. Cl.⁷ .................................. A23L 2/00; A23F 3/00
[52] U.S. Cl. ...................... 426/330.3; 426/335; 426/331; 426/597; 426/654; 426/650; 426/538
[58] Field of Search .................................. 426/330.3, 335, 426/331, 597, 654, 650, 538

[56] References Cited

U.S. PATENT DOCUMENTS

| 4,567,056 | 1/1986 | Schmidt .................................. 426/607 |
| 4,748,033 | 5/1988 | Syfert et al. .......................... 426/330.3 |
| 5,336,513 | 8/1994 | Reimer .................................... 426/548 |
| 5,431,940 | 7/1995 | Calderas et al. ..................... 426/330.3 |

FOREIGN PATENT DOCUMENTS

| 0 144 417 | of 0000 | European Pat. Off. . |
| 57-194775 | 11/1982 | Japan . |
| 97/21359 | 6/1997 | WIPO . |
| 97/30597 | 8/1997 | WIPO . |

OTHER PUBLICATIONS

Patent Abstracts of Japan for JP 56021557 published Feb. 1981 Inventor: Masahiko, Feb. 1981.
International Search Report in the application of PCT/EP 98/06637.
Patent Abstracts of Japan JP 04 027374 published Jan. 30, 1992.
Horvat et al., "A gas–liquid chromatographic Method for Analysis of Phenolic Acids in Plants", Journal of Agricultural Foods and Chemistry, vol. 28, pp. 1292–1295, 1980.
Patent Abstracts of Japan JP 61 195646 published Jan. 17, 1987.
Database WPI abstract of CN 1 008 739 published Jul. 6, 1994.
Patent Abstracts of Japan JP 07 194356 published Aug. 1, 1995.
Taylor, R. J., *Foods Additives*, John Wiley & Sons, pp. 44–49, (1980).
*Food Chemicals Codex*, National Academy Press, pp 354–418, (1981).
Branen et al., *Food Additives*, Marcel Dekker, Inc., pp 213–225, (1990).
Furia, Thomas E., *Handbook of Food Additives*, CRC Press, pp 271–276, (1968).
Woodbine, M., *Antibiotics and Antibiosis in Agriculture*, Butterworths, pp 103–130, (1977).
Derwent abstract of DE 44 34 314 published Mar. 28, 1996.
Abstract of JP 08 066 171 published Mar. 12, 1996.
Abstract of JP 59 015 477 published Jan. 26, 1984.
Derwent abstract of JP 49 015 788 published Apr. 17, 1974.
Derwent abstract of CN 1081578 published Feb. 9, 1994.

*Primary Examiner*—Anthony J. Weier
*Attorney, Agent, or Firm*—James J. Farrell

[57] ABSTRACT

An aqueous based tea solids containing beverage is taught which also contains a sufficient amount of cinnamic acid its salts and esters as a flavoring/antimicrobial compound and employs a hurdle approach with selected levels of water hardness, polyphosphate, sequestrants, pH adjustment, benzoic acid and sorbic acid to prevent microbiological outgrowth while simultaneously contributing to the pleasant flavor of the beverage thus making the beverage acceptable both organoleptically and microbiologically.

12 Claims, No Drawings

CINNAMIC ACID FOR USE IN TEA CONTAINING BEVERAGES

BACKGROUND OF THE INVENTION

1. Field of the Invention

The present invention relates to the use of a natural or synthetically prepared flavorant material which also acts as an antimicrobial in aqueous based beverages containing tea solids. This material is trans cinnamic acid as well as its salts and esters.

BRIEF DESCRIPTION OF THE INVENTION

Acidified and native pH ready-to-drink (RTD) tea beverages, in the 2.5–6.5 pH range regardless of packaging are known to be susceptible to spoilage. As compared to cans, tea beverages packaged in glass and plastic bottles (because of increased $O_2$ ingress), as well as tea beverages at the higher range of the pH spectrum, are even more sensitive to yeast and mold spoilage than canned teas.

There are many different processes for preparing and packaging or bottling ready-to-drink (RTD) teas. For example, in one process the bottles can all be sterilized and the tea beverage first pasteurized and then bottled at high temperature. Each of these high temperature treatments requires a large capital investment for equipment and if there were many different bottling plants the costs of equipping each of these multiple plants with such high temperature equipment would be prohibitive if not impossible to justify.

Further all of these high temperature expedients are relatively inefficient and require a very high use of energy and excessive costs in addition to the original equipment costs. It is thus seen to be desirable to be able to prepare and bottle RTD teas without using such cost ineffective, energy intensive methods which also require a large initial investment in equipment.

This is particularly significant if bottling is scheduled to take place in a large number of pre-existing bottling plants.

In an effort to overcome these problems a stepwise approach was taken. The principal requirement was to produce an excellent flavored tea beverage which is microbiologically acceptable and which can be shipped and stored in a normal distribution chain through various warehouses and retail consumer outlets. These requirements must be met while keeping costs to a reasonable level and using pre-existing bottling plants. This in turn necessitates minimizing capital investment in specialized equipment such as high temperature sterilizing and pasteurizing equipment and water treatment equipment such as reverse osmosis (RO) equipment.

Studies revealed that all of the above conditions could be satisfied by initiating a series of "hurdles" or steps each of which was designed to use existing equipment and resources. This could be accomplished within a reasonable cost while improving the microbiological stability of the tea beverage without deleteriously affecting its delicate flavor.

The steps include employing water having a very low water hardness; using a pH of about 2.5 to 4.0; using selected sequestrants with the pH and water adjustments; using selected polyphosphates in combination with the pH water and sequestrants; and using selected well known preservatives such as nisin, natamycin, sorbic acid and sorbates and benzoic acid and benzoates together with the low water hardness, the pH adjustment, sequestrants and polyphosphates. Together these steps contribute to this antimicrobial effect and thus individually each is incrementally antimicrobially effective.

Each of these steps produces at least incremental and frequently synergistic antimicrobial effects. None of them however contribute positively to the overall delicate flavor of the tea beverage, rather all of the steps taken are done to improve microbiological stability without negatively affecting the flavor. Thus the incrementally antimicrobially effective amount must take into account the flavor profile of the tea.

Many preservatives are readily available for many diverse uses. However natural compounds which are primarily flavorants are not usually considered for their antimicrobial activity.

There have been some attempts to use selected natural materials as preservatives. One of them is illustrated in Japanese Patent application 57/194,775 where cinnamic acid is used in combination with selected other organic acids including citric acid and sorbic acid.

U.S. Pat. No. 5,431,940 takes the approach of stabilizing beverages by using water having a low degree of hardness in combination with other preservatives, and polyphosphates. The alkalinity is specified.

Tea containing beverages, because of their delicate balance of flavors require the utmost care in selecting preservatives. A fine balance must be achieved in stabilizing teas without deleteriously affecting their flavor. Thus it is desirable to employ a natural compound as a flavorant which also may serve as an antimicrobial.

A method and composition is disclosed employing the stepwise or "hurdle" approach described above together with cinnamic acid for imparting a pleasant flavor to tea beverages while simultaneously contributing to the control of microbial growth in ready-to-drink still and carbonated tea beverages, for distribution and sale at ambient or chilled temperatures. The beverages include herbal teas, both "still" and carbonated as well as black, oolong and green tea. The method uses cinnamic acid in combination with the hurdle or step approach. This cinnamic acid compound may be natural or synthesized and may include reaction products of cinnamic acid such as esters and salts thereof.

The method, which also contributes to the stability of tea beverages employs trans cinnamic acid or phenylpropenoic acid as well as reaction products such as salts and esters of the acid. Simple esters such as the methyl, ethyl and propyl esters are preferred.

This compound imparts pleasant or unique desirable and distinctive flavors to tea beverages when properly combined. It also contributes to the stability of the beverage and may be used alone or in combination with mild heat treatments or reduced levels of traditional chemical preservatives such as sorbic and/or benzoic acid and their salts. It also contributes to antimicrobial activity at both ambient and chilled temperatures.

As mentioned above acidified and native pH based tea beverages including juice flavored and juice containing tea beverages in the 2.5–7.0 pH range are known to be susceptible to spoilage by yeast, mold, acid tolerant bacteria (e.g. Lactobacillus sp, Gluconobacter/Acetobacter sp.) and/or mesophilic or thermophilic spore forming (e.g. *B. coagulans* and the Alicyclobacillus sp.) and non-spore forming bacteria. The compound of the invention 3-phenylpropenoic acid (i.e. trans-cinnamic acid), when formulated in the invention in combination with low levels of sorbic or benzoic acids and mixtures of these as well as other flavor components contributes to a pleasant unique, desirable and distinctive flavored tea while adding the benefit of its antimicrobial activity. The compounds may be used at individual concentrations of preferably from about 25 to about 600 ppm and while used primarily as a flavorant have been found to be extremely effective antimicrobials. The compounds are effective against yeast, mold, and other acid tolerant and non-acid tolerant spore-forming and non-spore-forming spoilage bacteria in ready-to-drink tea beverages and tea beverages containing juice, fruit or vegetable extracts and/or additional flavors.

Higher levels of the compound of the invention up to about 2,000 ppm or higher may be used if desired.

The increased efficacy of this compound as an antimicrobial, relative to a simple phenolic acid like benzoic acid, is believed to be attributable to the presence of an unsaturated side chain. The efficacy of this side chain increases with the length of the side chain and the number of reactive double bonds contained in the same. The presence of these double bonds enhances the reactivity of the compound, internal to the microbial cell, after passive transport of the compound into the cell. This is similar to the transport of benzoic acid into the cell. The subsequent combination effects of the dissociation of the acid moiety internal to the cell, and the accompanying presence of one or more highly reactive double bonds, contributes significantly to the antimicrobial effect observed.

The use of the disclosed compound, both naturally derived and synthetically prepared, provides a unique antimicrobial compound that may be used to formulate beverages which are "all-natural", by the current definition of the term. Pleasantly flavored, ready-to-drink still and carbonated tea beverages that are stable and safe at ambient temperatures and/or that have an extended shelf life at chill temperatures are thus enabled.

A specific example of the compound is as follows:

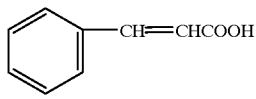

Trans cinnamic acid is preferred and selected salts and simple esters of cinnamic acid are also useful.

While not wishing to be bound thereby, it is theorized that the antimicrobial material operates as follows: Essentially the organism will typically passively transport the compound class described, in its non-dissociated (uncharged) state. Once the compound is in the cell it begins to dissociate, essentially upsetting the pH balance internal to the cell. An organism such as Z. bailii, one of the yeast species that poses a serious spoilage problem in beverages is reported to possess an ability to pump a preservative such as benzoic acid out quite readily thus, leading to Z. bailii's reputation as being somewhat preservative resistant. The compound of the present invention is less likely to succumb to the preservative pump because of added high reactivity of the unsaturated side chain. It is believed that for this reason the compound disclosed is effective.

In addition to the selected flavorant for tea beverages it is required to lower the pH to about 2.5 to 4.0 to improve the beverage stability. This is particularly useful when fruit juices or fruit flavors are employed in ready to drink tea beverages such as lemon flavored tea beverages.

Further it has been found that the flavorant/antimicrobial compound of the invention provides improved stability in tea beverages when the magnesium and calcium ions common to tap water are kept to no more than about 300 ppm as $CaCO_3$. Preferably the hardness is less than about 100 ppm and most preferably less than about 50 ppm or even lower such as 25 ppm or less. This can be achieved by deionization reverse osmosis or ion exchange in appropriate manner.

In addition it has been found that selected phosphates also contribute to stability and flavor and thus about 100 ppm to about 1000 ppm or higher and preferably about 250 to 500 ppm of a polyphosphate having the formula:

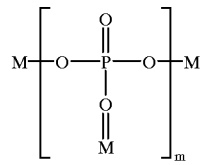

where m averages about 3 to 100 and M may be sodium or potassium.

Preservatives such as sorbic acid or sorbates and benzoic acid or benzoates or parabens used alone or in combination at levels of 50 to 1000 ppm are particularly beneficial without affecting flavor.

Additional sequestrants such as EDTA, NTA and the like have also been found to be useful in amounts of about 20 ppm up to about 1000 ppm and preferably about 30 ppm to about 1000 ppm. When EDTA is used the lower levels are preferred. Many suitable sequestrants are listed in the Handbook of Food Additives, 2nd Edition, edited by Furia, CRC Press.

As used herein, the term "tea concentrate" refers to a product derived from concentrated tea extract which is mixed with water to form a drinkable tea beverage. The method of extraction is not significant and any method known in the art may be used.

As used herein, the term "tea beverage" refers to a drinkable beverage prepared from tea concentrates, extracts or powder. Usually the beverage is prepared by mixing with water. Various other flavoring agents and/or juices may also be included in the tea beverage such as fruit juices, vegetable juices and the like. If a concentrate or powder is used then the concentrate or powder is generally diluted with sufficient water to provide the tea beverage. Preferred tea concentrates or powders are typically diluted to about 0.06 to 0.4% tea solids, and preferably about 0.08 to 0.2% tea solids to provide a drinkable tea beverage but this depends on the flavor profile sought and amounts of 0.01 to 0.5% or higher may be used.

As used herein, the term "tea solids" refers to those solids normally present in a tea extract including normal tea antioxidants. Polyphenolic compounds are normally the primary component of tea solids when prepared from an extract of *Camellia sinensis*. However, tea solids can also include caffeine, proteins, amino acids, minerals and carbohydrates.

All parts and proportions herein and the appended claims are by weight unless otherwise indicated.

In order to demonstrate a stepwise or "hurdle" approach to achieving microbiological stability, several sets of experiments were run to establish the criticality of employing this approach. The individual steps are as follows:

1. water with a low water hardness;
2. pH control;
3. sequestrants including EDTA;
4. polyphosphate;
5. benzoate;

6. sorbate;

7. trans cinnamic acid.

A ready to drink (RTD) tea composition containing about 0.08% tea solids was prepared having the following general composition.

|  | % |
|---|---|
| K Benzoate | .03% |
| K Sorbate | .04% |
| Tea powder | .08% |
| Color Component | .06% |
| Citric Acid | .07% |
| Lemon Flavor | .1% |
| HFCS (High Fructose Corn Syrup 55DE) | 12.% |
| Water balance to | 100.% | pH was adjusted to 2.8 with phosphoric acid.

EXAMPLE 1

Water hardness measured as $C_a(CO_3)$ in the presence and absence of 30 ppm of EDTA was studied at different water hardness levels including 28 ppm; 36 ppm; 72 ppm and 138 ppm.

The RTD beverage was prepared as above at several water hardness levels and inoculated with *Z bailii*, preservative resistant spoilage yeast at a level of 10 colony forming units (CFU) per ml of beverage. The beverage was then bottled and observed for failure such as a plate count with at least a 2 log increase or "Frank Spoilage" such as for example $CO_2$ production or sediment or the like. Tabular results follow:

TABLE 1

Cumulative percent of bottles that have failed 28 ppm water hardness

|  | with EDTA |  |  |  |  | without EDTA |  |  |  |  |
|---|---|---|---|---|---|---|---|---|---|---|
| weeks | 1 | 5 | 8 | 13 | 16 | 1 | 5 | 8 | 13 | 16 |
| % | 0 | 0 | 0 | 0 | 0 | 0 | 0 | 0 | 0 | 0 |

TABLE 2

Cumulative percent of bottles that have failed 36 ppm water hardness

|  | with EDTA |  |  |  |  | without EDTA |  |  |  |  |
|---|---|---|---|---|---|---|---|---|---|---|
| weeks | 1 | 5 | 8 | 13 | 16 | 1 | 5 | 8 | 13 | 16 |
| % | 0 | 0 | 0 | 0 | 3 | 0 | 0 | 0 | 0 | 5 |

TABLE 3

Cumulative percent of bottles that have failed 72 ppm water hardness

|  | with EDTA |  |  |  |  | without EDTA |  |  |  |  |
|---|---|---|---|---|---|---|---|---|---|---|
| weeks | 1 | 5 | 8 | 13 | 16 | 1 | 5 | 8 | 13 | 16 |
| % | 0 | 0 | 0 | 3 | 3 | 0 | 0 | 0 | 100 | — |

TABLE 4

Cumulative percent of bottles that have failed 138 ppm water hardness

|  | with EDTA |  |  |  |  | without EDTA |  |  |  |  |
|---|---|---|---|---|---|---|---|---|---|---|
| weeks | 1 | 5 | 8 | 13 | 16 | 1 | 5 | 8 | 13 | 16 |
| % | 0 | 11 | 73 | 83 | 87 | 0 | 100 | — | — | — |

These results clearly show that increasing water hardness reduces the microbial stability of the beverages and the addition of EDTA increases the microbial stability of the beverages. The addition of EDTA has been reported to destabilize the microbial cell wall and cell membrane. Accordingly, EDTA is theorized to have the effect of contributing to stability of the beverage by reducing water hardness, chelating metals and increasing the permeability of the microbial cell wall to preservatives by destabilizing the wall and membrane.

EXAMPLE 2

A study was done to determine the impact of hexametaphosphate at a level of about 500 ppm at a pH of 2.8 and 3.2. An RTD beverage was prepared and bottled as in Example 1 except with EDTA at 30 ppm and water hardness at 50 ppm and inoculated with *Z bailii* at 1 CFU and 10 CFU except that the hexametaphosphate was either present or absent.

TABLE 5 pH 2.8 - 1 CFU - Cumulative % Failures

| weeks | 2 | 4 | 6 | 8 | 10 |
|---|---|---|---|---|---|
| sodium hexametaphosphate 0 ppm | 8 | 100 | — | — | — |
| sodium hexametaphosphate 500 ppm | 0 | 0 | 3 | 84 | 100 |

TABLE 6 pH 2.8 - 10 CFU - Cumulative % Failures

| weeks | 2 | 4 | 6 | 8 | 10 |
|---|---|---|---|---|---|
| sodium hexametaphosphate 0 ppm | 47 | 100 | — | — | — |
| sodium hexametaphosphate 500 ppm | 0 | 0 | 100 | — | — |

TABLE 7 pH 3.2 - 1 CFU - Cumulative % Failures

| weeks | 1 | 2 | 3 | 4 | 6 | 8 | 10 |
|---|---|---|---|---|---|---|---|
| sodium hexametaphosphate 0 ppm | 0 | 0 | 89 | 100 | — | — | — |
| sodium hexametaphosphate 500 ppm | 0 | 0 | 3 | 100 | — | — | — |

TABLE 8 pH 3.2 - 10 CFU - Cumulative % Failures

| weeks | 1 | 2 | 3 | 4 | 6 | 8 | 10 |
|---|---|---|---|---|---|---|---|
| sodium hexametaphosphate 0 ppm | 0 | 39 | 100 | — | — | — | — |
| sodium hexametaphosphate 500 ppm | 0 | 0 | 100 | — | — | — | — |

The results clearly show the enhancement in the delay of the onset of spoilage by the use of hexametaphosphate. Additionally this reinforces that lower pH contributes to the microbial stability of the beverage.

EXAMPLE 3

A study examined the effect of pH at 2.8 and 3.1 in the presence and/or absence of benzoic and sorbic acids. The RTD beverage was prepared and bottled as in Example 1 except 30 ppm of EDTA was added. The amount and presence of sorbic acid and benzoic acid was varied and the water hardness was set at 50 ppm. The inoculum used was 1 CFU/ml of beverage of *Z bailii* preservative resistant yeast:

Tabular results follow:

TABLE 9

Benzoic acid - 0 ppm
Sorbic acid 200 ppm

Cumulative % Failures

| weeks | 2 | 4 | 6 | 8 | 10 | 12 |
|---|---|---|---|---|---|---|
| pH 3.1 | | | | | | |
| % | 0 | 11 | 43 | 54 | 54 | 62 |
| pH 2.8 | | | | | | |
| % | 0 | 0 | 0 | 0 | 3 | 3 |

TABLE 10

Benzoic acid - 200 ppm
Sorbic acid 0 ppm

Cumulative % Failures

| weeks | 2 | 4 | 6 | 8 | 10 | 12 |
|---|---|---|---|---|---|---|
| pH 3.1 | | | | | | |
| % | 0 | 44 | 92 | 92 | 92 | 94 |
| pH 2.8 | | | | | | |
| % | 0 | 0 | 8 | 11 | 14 | 14 |

TABLE 11

Benzoic acid - 100 ppm
Sorbic acid 100 ppm

Cumulative % Failures

| weeks | 2 | 4 | 6 | 8 | 10 | 12 |
|---|---|---|---|---|---|---|
| pH 3.1 | | | | | | |
| % | 0 | 3 | 8 | 14 | 14 | 14 |
| pH 2.8 | | | | | | |
| % | 0 | 0 | 0 | 0 | 0 | 0 |

These results demonstrate the synergistic effect of the combination of sorbic acid benzoic acid as well as the effect of lower pH on microbial stability of the beverage.

EXAMPLE 4

A study was run to identify the effect of trans cinnamic acid on microbial stability in a tea system. The RTD. beverage of Example 1 was used except that the pH is 3.0 and the water hardness is set at 72 ppm and 30 ppm EDTA was used. The inoculum was 1 CFU/ml of beverage of *Z bailii* preservative resistant yeast.

Tabular results follow:

TABLE 12

"Frank Spoilage" with and without trans cinnamic acid 125 ppm

Cumulative % of failures
pH 3.0

| weeks | 2 | 4 | 6 | 10 | 12 | 14 |
|---|---|---|---|---|---|---|
| with t-cinnamic acid - % | 0 | 0 | 0 | 0 | 0 | 0 |
| without t-cinnamic acid - % | 0 | 0 | 18 | 45 | 45 | 47 |

The results show that trans cinnamic acid has a positive effect on microbial stability. The natural tea flavor/profile is enhanced by the presence of the trans cinnamic acid.

EXAMPLE 5

A study was done using t cinnamic acid and building on the sorbate, benzoate synergy shown in Example 3. The variants in Example 3 were repeated to determine whether trans cinnamic acid affords additional stability at lower preservative levels. The RTD beverage of Example 1 was prepared. 30 ppm of EDTA was added and the water hardness was 50 ppm. Additionally the amount and presence of sorbic acid and benzoic acid was varied, the pH was varied and the amount and presence of trans cinnamic acid was varied. 1 CFU/ml of *Z bailii* was used as an inoculum.

TABLE 13

Benzoic acid - 0 ppm
Sorbic acid 200 ppm

Cumulative % of failures
pH 3.1

| weeks | 2 | 4 | 6 | 10 | 12 | 14 |
|---|---|---|---|---|---|---|
| t-cinnamic acid - 0 ppm - % | 0 | 11 | 43 | 54 | 54 | 62 |
| t-cinnamic acid - 100 ppm - % | 0 | 0 | 3 | 3 | 3 | 3 |

TABLE 14

Benzoic acid - 200 ppm
Sorbic acid 0 ppm

Cumulative % of failures
pH 3.1

| weeks | 2 | 4 | 6 | 10 | 12 | 14 |
|---|---|---|---|---|---|---|
| t-cinnamic acid - 0 ppm - % | 0 | 44 | 92 | 92 | 92 | 94 |
| t-cinnamic acid - 100 ppm - % | 0 | 0 | 5 | 11 | 11 | 11 |

TABLE 15

Benzoic acid - 100 ppm
Sorbic acid 100 ppm

Cumulative % of failures
pH 3.1

| weeks | 2 | 4 | 6 | 10 | 12 | 14 |
|---|---|---|---|---|---|---|
| t-cinnamic acid - 0 ppm - % | 0 | 3 | 8 | 14 | 14 | 14 |
| t-cinnamic acid - 100 ppm - % | 0 | 0 | 0 | 5 | 5 | 8 |

TABLE 16

Benzoic acid - 0 ppm
Sorbic acid 200 ppm

Cumulative % of failures
pH 2.8

| weeks | 2 | 4 | 6 | 10 | 12 | 14 |
|---|---|---|---|---|---|---|
| t-cinnamic acid - 0 ppm - % | 0 | 0 | 0 | 0 | 3 | 3 |
| t-cinnamic acid - 100 ppm - % | 0 | 0 | 0 | 0 | 0 | 0 |

TABLE 17

Benzoic acid - 200 ppm
Sorbic acid 0 ppm

Cumulative % of failures
pH 2.8

| weeks | 2 | 4 | 6 | 10 | 12 | 14 |
|---|---|---|---|---|---|---|
| t-cinnamic acid - 0 ppm - % | 0 | 0 | 8 | 11 | 14 | 14 |
| t-cinnamic acid - 100 ppm - % | 0 | 0 | 0 | 0 | 0 | 0 |

TABLE 18

Benzoic acid - 100 ppm
Sorbic acid 100 ppm

Cumulative % of failures
pH 2.8

| weeks | 2 | 4 | 6 | 10 | 12 | 14 |
|---|---|---|---|---|---|---|
| t-cinnamic acid - 0 ppm - % | 0 | 0 | 0 | 0 | 0 | 0 |
| t-cinnamic acid - 100 ppm - % | 0 | 0 | 0 | 0 | 0 | 0 |

The results clearly demonstrate the effectiveness of trans cinnamic acid to stabilize beverages at a reduced preservative level as well as the overall effect of the "hurdle" approach. The improved flavor profile of beverage with trans cinnamic acid used to lower the preservative level is quite noticeable.

Although the invention has been described with respect to preferred embodiments thereof, variations and modifications will be readily apparent to those skilled in the art without departing from the spirit and scope of the invention as set forth in the claims.

What is claimed is:

1. A tea beverage containing a compound selected from the group consisting of cinnamic acid, cinnamic acid salts, cinnamic acid esters and mixtures thereof said beverage having been prepared with a series of control steps consisting essentially of incremental pH control, incremental addition of hexametaphosphate, incremental addition of sorbic acid, incremental addition of benzoic acid, incremental addition of EDTA and incremental water hardness control to stabilize said beverage, said compound being present in the beverage in an antimicrobial effective amount in combination with said control steps and said compound being capable of having a selected flavoring effect on said beverage.

2. An aqueous based beverage comprising about 0.02% to 0.5% tea solids by weight and a sufficient amount of cinnamic acid, its salts and esters in combination with hurdles as defined in claim 1 to prevent microbial spoilage.

3. A beverage as defined in claim 2 wherein said cinnamic acid is present in an amount of about 50 to 600 ppm.

4. A beverage defined in claim 2 having a sufficient amount of said cinnamic acid in combination with said incremental control steps to completely inhibit the outgrowth of yeast, mold and other microbes.

5. A beverage as defined in claim 2 further comprising sufficient tea solids to result in an antioxidant effect.

6. A beverage as defined in claim 2 further comprising a flavoring agent and a material selected from the group consisting of fruit, fruit extract, fruit juice, vegetable juice, vegetable extract and mixtures thereof in addition to tea.

7. A beverage as defined in claim 1 wherein said cinnamic acid is natural.

8. A beverage as defined in claim 1 wherein said cinnamic acid is synthetic.

9. A beverage as defined in claim 1, wherein said cinnamic acid is trans cinnamic acid.

10. A method for improving the microbiological stability of an aqueous based tea beverage without negatively affecting the flavor of said beverage comprising:

controlling the water hardness of said beverage to an antimicrobial level;

controlling the pH of said beverage to an incrementally antimicrobial level;

adding an incrementally antimicrobial effective amount of polyphosphate to said beverage;

adding an incrementally antimicrobial effective amount of a sequestrant other than polyphosphate to said beverage;

adding an incrementally antimicrobial effective amount of benzoic acid or benzoate to said beverage;

adding an incrementally antimicrobial effective amount of sorbic acid or sorbate to said beverage;

adding an incrementally antimicrobial effective amount of cinnamic acid to said beverage, whereby the total amount of incremental additives is sufficient to constitute an antimicrobially effective amount in said beverage.

11. A method for improving the microbiological stability of a tea beverage comprising:

controlling the water hardness of the beverage to a level of less than about 70 ppm;

controlling the pH of the beverage to less than about 3.1;

adding at least about 500 ppm of polyphosphate to said beverage;

adding at least about 30 ppm of sequestrant other than polyphosphate to said beverage;

adding at least about 100 ppm of benzoic acid or benzoate to said beverage;

adding at least about 100 ppm of sorbic acid or sorbate to said beverage;

adding to said beverage about 20 to 200 ppm of a compound selected from the group consisting of cinnamic acid; cinnamic acid salts, cinnamic acid esters and mixtures thereof.

12. A tea beverage having a water hardness of about 10 ppm to 150 ppm measured as $C_aCO_3$; a pH of less than about 3.1; about 100 to 1000 ppm of sodium hexametaphosphate; about 10 to 75 ppm of EDTA; about 50 to 1000 ppm of benzoic acid or benzoate; about 50 to 1000 ppm of sorbic acid or sorbate; and about 20 to 2000 ppm of a compound selected from the group consisting of cinnamic acid, cinnamic acid salts, cinnamic acid esters and mixtures thereof.

* * * * *